Sept. 16, 1930.  E. K. HOLMES  1,775,766
METHOD AND MACHINE FOR FLANGING TUBES
Filed May 24, 1926  2 Sheets-Sheet 2

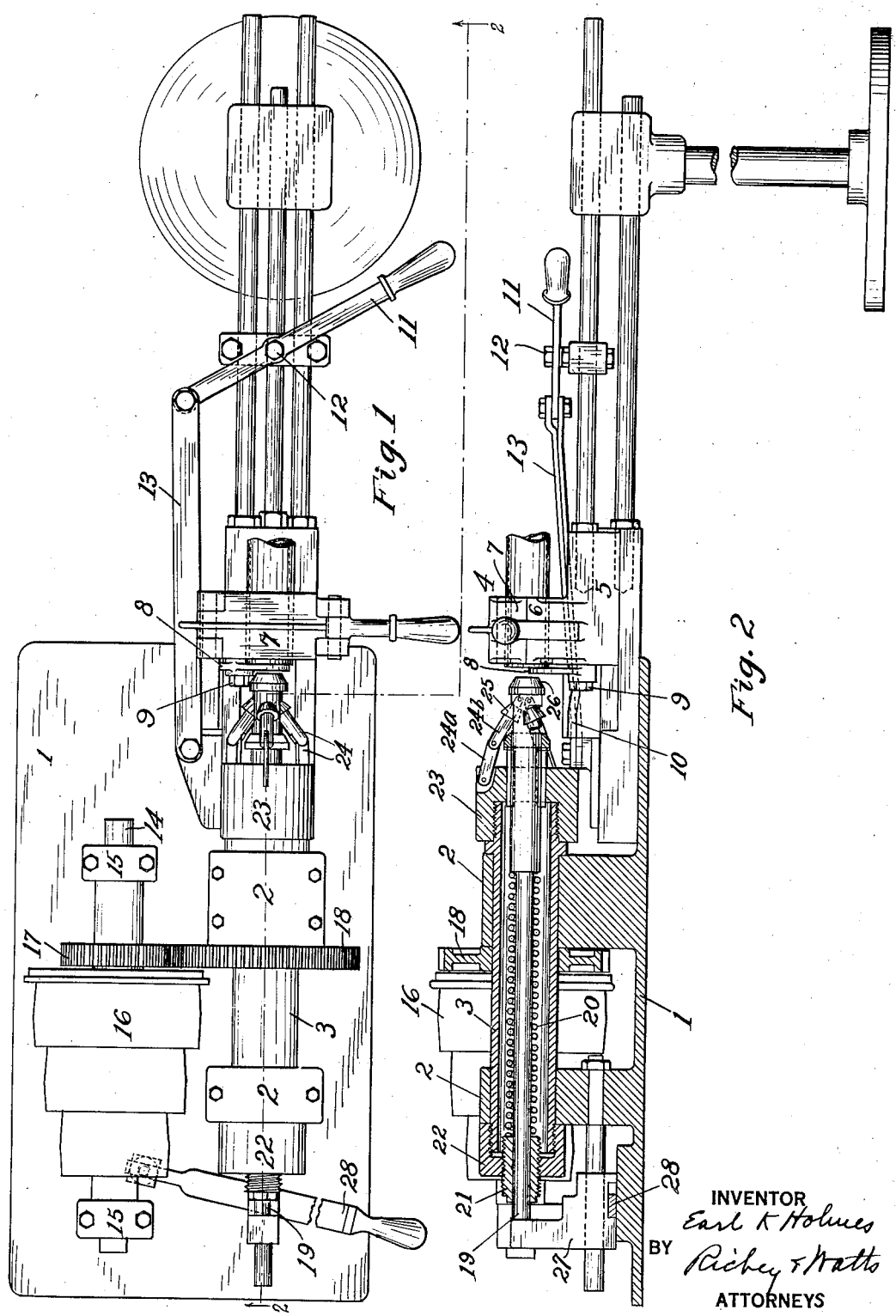

INVENTOR
Earl K. Holmes
BY
Richey & Watts
ATTORNEYS

Patented Sept. 16, 1930

1,775,766

UNITED STATES PATENT OFFICE

EARL K. HOLMES, OF CLEVELAND, OHIO, ASSIGNOR, BY MESNE ASSIGNMENTS, TO STEEL AND TUBES, INC., OF CLEVELAND, OHIO, A CORPORATION OF OHIO

METHOD AND MACHINE FOR FLANGING TUBES

Application filed May 24, 1926. Serial No. 111,275.

This invention relates to a method and machine for flanging tubes.

An object of this invention is to provide a machine for flanging the ends of tubes which will be simple in construction and efficient in operation.

Another object is to provide an improved and expeditious method of flanging a tube which comprises flaring an end of a tube under unyielding pressure and completing the flange under yielding pressure.

Other objects will hereinafter appear.

The invention will be better understood from the description of one practical embodiment thereof illustrated in the accompanying drawing, in which, Fig. 1 is a plan view of the tube flanging machine.

Fig. 2 is a front elevation thereof, partly in section, in line 2—2 of Fig. 1.

Figure 3:
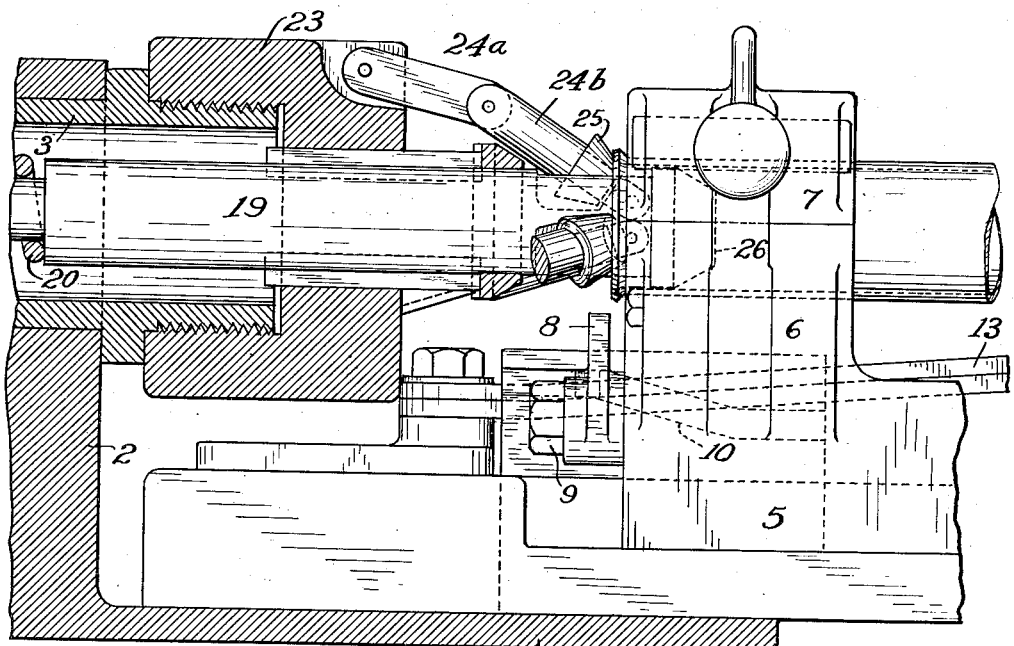
Fig. 3 is an enlarged fragmentary elevation, partly in section, of the flanging head and associated parts in the position occupied during the first part of the flanging operation, and, Fig. 4 is a view similar to Fig. 3 of the parts at the end of the flanging operation.

The machine illustrated comprises a base 1 upon which aligned bearings 2 are supported. In the bearings 2 is journaled a hollow shaft 3 which supports the flanging mechanism to be hereinafter described.

The base also supports a longitudinally movable fixture 4 in which the tube may be clamped while same is being flanged. The fixture comprises a base 5 mounted in guides upon the base of the machine on which it slides longitudinally and an upstanding portion 6 terminating in a vise 7 in which the end of the tube may be firmly clamped. The fixture also carries a stop or gauge 8 pivoted thereto by a bolt 9 and having an arm traveling in groove 10 in the base of the machine. This stop limits the amount of pipe extending from the fixture and which is to be flanged. As the fixture is moved towards the flanging apparatus, the arm is cammed upwardly by the groove, causing the stop or gauge to be moved downwardly so as not to obstruct the flanging tool.

The fixture is moved longitudinal to the machine by a handle or lever 11 pivoted thereto at 12 and having one end fulcrumed to a link 13 fastened to the base of the machine.

Parallel to the hollow shaft a second shaft 14 is supported in bearings 15 on the base of the machine. This shaft carries a step pulley 16 and a gear 17 which meshes with a gear 18 keyed to the hollow shaft.

Extending through the hollow shaft is a spindle 19 coaxial therewith which may reciprocate lengthwise and is urged toward the fixture by spring 20, the tension of which may be adjusted by a threaded bushing 21 carried by the cap 22 at the end of the shaft. The other end of the shaft is provided with a head 23 and the head and adjacent end of the spindle hereinafter called the front end of the spindle are connected to the ends of toggles 24 comprising links 24ᵃ and 24ᵇ, each link 24ᵇ of which supports a frustroconical roller 25. The front end of the spindle carries a frusto-conical pilot or mandrel 26. The spindle may also be urged toward the fixture by a block 27 which bears on the rear end of the spindle and slides upon the base of the machine. A handle or lever 28 is pivoted to the base of the machine and extends through a notch in the block so that movement of the lever will slide the block toward or from the spindle.

Figure 4:
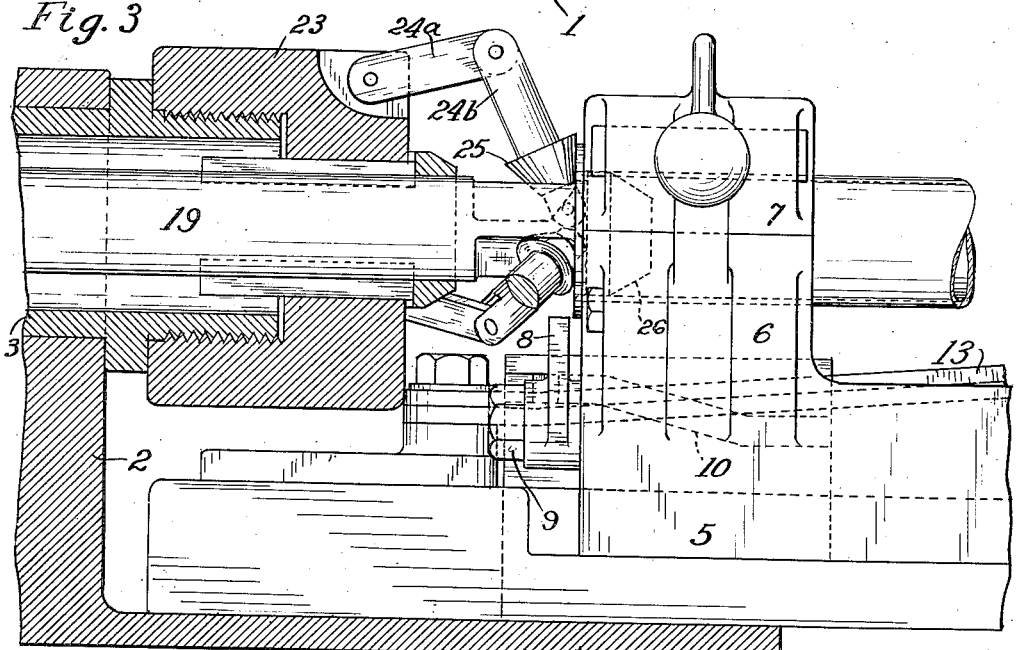

The operation of the machine is as follows:

The operator opens the vise and inserts therein the end of a tube to be flanged, extending it through the vise until it abuts the stop or guide. He then closes and fastens the vise to cause the same to grip the tube. He next takes the handles of both levers and moves them toward each other. Handle 11 advances the fixture toward the rotating shaft and handle 28, assists the spring in maintaining the spindle extended through the hollow shaft. As the fixture is moved toward the shaft, the stop or guide is cammed out of the way so that the pilot or mandrel of the rotating spindle may enter the projecting end of the tube. The rollers, being in the position shown in Figs. 2 and 3, extend slightly within the tube and roll around its inner edge, expanding the end outwardly as shown in Fig. 3. When the rollers have reached a point where the tube is being directly compressed between them and the walls of the vise, the operator releases handle 28, leaving the spindle free to be pressed inwardly against the pressure of spring upon further movement of the fixture. As the operator moves the fixture further to the left, as shown in the drawings, and so presses the spindle against the spring, the toggles "break" outwardly, the links 24ᵇ becoming more nearly radial to the spindle as shown in Fig. 4, conical rollers engaging the ends of the tube. These rollers travel at high speed around the flared tube end and spin the same, causing its walls to diverge more and more as the surface of the rollers engaging the flanged end of the tube approach the normal to the spindle axis. When this plane is reached by the rollers, the flange will have been flattened so that it lies against the face of the vise and is normal to the axis of the tube.

From the above it will be seen that I have provided a simple, compact and rugged machine for flanging tubes which is simple and convenient to operate and which will quickly and easily produce flanges of a given diameter on a tube without requiring any particular care on the part of the operator as to how the tubes are positioned in the machine, and an effective flanging method which may be carried out with the machine disclosed herein or any other apparatus adapted to the purpose.

What is claimed is: —

1. A tube flanging machine having a rotatable shaft, a spindle keyed to said shaft and slidable longitudinally therein, an adjustable spring surrounding said spindle within said shaft and extending the working end of the spindle, a pilot carried by the working end of the spindle, toggles connecting said working end of the spindle with the adjacent end of the shaft, rollers carried by the toggles, and manual means for exerting pressure on the opposite end of the spindle to assist the spring in extending the operating end of the spindle from the shaft.

2. A tube flanging machine comprising gripping means for holding a tube near its end, rollers for spinning the end of the tube outwardly to form a flange, means for relatively rotating the tube and rollers, said rotating means being operative at a speed sufficiently high to carry out spinning operations, means for pressing the tube and rollers together, and means for changing at will the inclination of the rollers relative to the axis of the tube.

3. In a tube flanging machine, the combination of a hollow shaft, a spindle extending therethrough, a spring urging said spindle toward the tube-receiving end of the machine, a series of toggles connecting the ends of said spindle and said shaft, rollers carried by said toggles, and means to rotate the rollers at high speed suitable for spinning.

4. A pipe flanging machine comprising a tube-clamping fixture movable longitudinally of the machine, means for positively locating a tube in said fixture with one end projecting a predetermined distance therethrough, a pilot aligned with said fixture, rollers carried by said pilot for engaging said end of the tube, and means to control at will the inclination of the rollers to the axis of the tube, and means for rotating the rollers with respect to the tube end at a spinning speed whereby spinning operations are performed on the tube end.

5. A tube flanging machine comprising a vise for holding a tube to be flanged, a spindle, means for rotating the spindle, rollers on said spindle, and means to feed the vise toward the rollers to engage the tube end with the rollers and flange the end.

6. A tube flanging machine comprising a vise for holding a tube to be flanged, a rotatable spindle, rollers on said spindle for engaging the tube end portion, means to feed the vise and spindle toward each other, and separate means to rotate the rollers at high speed suitable for spinning.

7. A tube flanging machine comprising a vise for holding a tube to be flanged, a rotatable spindle, tube engaging rollers on said spindle, means to rotate the rollers at high speed suitable for spinning, and means to limit the position of the tube in the vise for forming a flange of a predetermined size, said limiting means being removable out of the way of the tube when spinning operations are performed thereon.

8. In a tube flanging machine, an assembly comprising a support, a spindle, a plurality of rolls disposed about and pivoted to the spindle, means for yieldably permitting recession of the spindle with respect to the support, means connected to the rolls and to the support to expand the rolls during the recession, and means for rotating the assembly, in combination with means whereby the tube end and rolls can be pressed together to flare the tube end.

9. In a tube flanging machine, an assembly comprising a support, a spindle mounted for movement with respect to the support, a plurality of rolls disposed about and pivoted to the spindle, means connected to the rolls and to the support to expand the rolls upon the said movement, and means for rotating the assembly, in combination with means whereby the tube end and rolls can be pressed together whereby the end is flared by the rolls.

10. In a tube flanging machine, an assembly comprising a support, a spindle mounted for movement with respect to the support, means for yieldably resisting the movement, a plurality of rolls disposed about and pivoted to the spindle, means connected to the rolls and to the support to expand the rolls upon the said movement, and means for rotating the said assembly, and means whereby the tube end and rolls can be pressed together whereby the end is flared by the rolls.

11. In a tube flanging machine, an assembly comprising a support, a spindle mounted for movement with respect to the support, means to yieldably resist the movement, a plurality of rolls disposed about and pivoted to the spindle, means connected to the rolls and to the support to expand the rolls upon the said movement, and means for rotating the assembly, and means whereby the tube end can be pressed against the rolls whereby the tube is flanged.

12. In a tube flanging machine, an assembly comprising a support, a spindle mounted for movement with respect to the support, a plurality of rolls disposed about and pivoted to the spindle, means connected to the rolls and to the support to expand the rolls upon the said movement, and means for rotating the assembly, in combination with manually actuated means for pressing the tube end against the rolls, and manually actuated means for preventing recession of the rolls at will.

13. In a tube flanging machine, an assembly comprising a support, a spindle mounted for movement with respect to the support, a plurality of rolls disposed about and pivoted to the spindle, means connected to the rolls and to the support, to expand the rolls upon the said movement, and means for rotating the assembly, in combination with manually actuated means for pressing the tube end against the rolls, means to cause the rolls to yieldably resist the pressure, and manually actuated means for preventing recession of the rolls at will.

14. A tube flanging machine comprising a roll carrying assembly, means for rotating the same, tube supporting means, gauge means for determining the position of the tube in the supporting means, and manually actuated means for pressing the tube end and rolls together to flare the tube end against the supporting means.

15. A tube flanging machine comprising a roll carrying assembly, means for rotating the same, tube supporting means, gauge means against which the end of the tube can be abutted in positioning the tube, means for moving the supporting means forward the rolls, and means for moving the gauge means laterally of the tube end whereby the tube can be pressed against the revolving rolls.

16. The method of forming a flange upon the end of a tube which comprises pressing the end walls of the tube under unyielding pressure laterally to flare the same to a limited extent, and pressing the flared walls of the tube under yielding pressure to increase the flare.

17. The method of forming a flange on a tube which comprises flaring the end of the tube outwardly at a slight angle under unyielding pressure, and flaring the end outwardly to an increased angle by means of the application of yielding pressure thereto.

18. A tube flanging machine comprising, in combination, tube supporting means, an expanding device for deforming one end of a tube to provide a flange, means for rotating the expanding device at a high rate of speed to operate on the tube end with a spinning action, and means for bringing the tube end into engagement with the expanding device.

19. In a tube flanging machine, the combination, with a shaft, a spindle associated therewith, and a spring urging said spindle toward the tube receiving end of the machine, of a toggle device connecting said spindle and said shaft, roller means carried by said toggle device, and means to rotate the roller means at a high speed suitable for spinning.

20. In a tube flanging machine, the combination with tube deforming means, of a tube holding device for holding a tube to be flanged, a stop member for accurately positioning a tube in the holding device, and means automatically operable incident to movement of the tube holding means toward the tube deforming means to remove the stop member out of the path of the tube.

21. In a tube flanging machine, the combination, with means for breaking down the initial resistance to deformation of a tube end and slightly flaring the same, said means including a device operating with a spinning action, of means associated with said first named means operative to cause the latter to further deform the flared portion of the tube end to provide a finished flange thereon.

22. In a tube flanging machine, the combination, with a tube supporting device, a roller device associated with the tube supporting device to operate on a tube held thereby, said roller device constituting a means operative by spinning operations to overcome the initial resistance of a tube end to deformation and slightly flare the same, and means for adjusting the roller device whereby the latter is constituted a means to further deform the flared portion of a tube end to provide a finished flange thereon.

In testimony whereof I hereunto affix my signature this 20th day of May, 1926.

EARL K. HOLMES.